No. 645,212. Patented Mar. 13, 1900.
E. J. PRESTON & A. B. GILL.
ELECTRIC LIGHTING APPARATUS FOR RAILROAD CARS.
(Application filed Jan. 2, 1900.)
(No Model.)
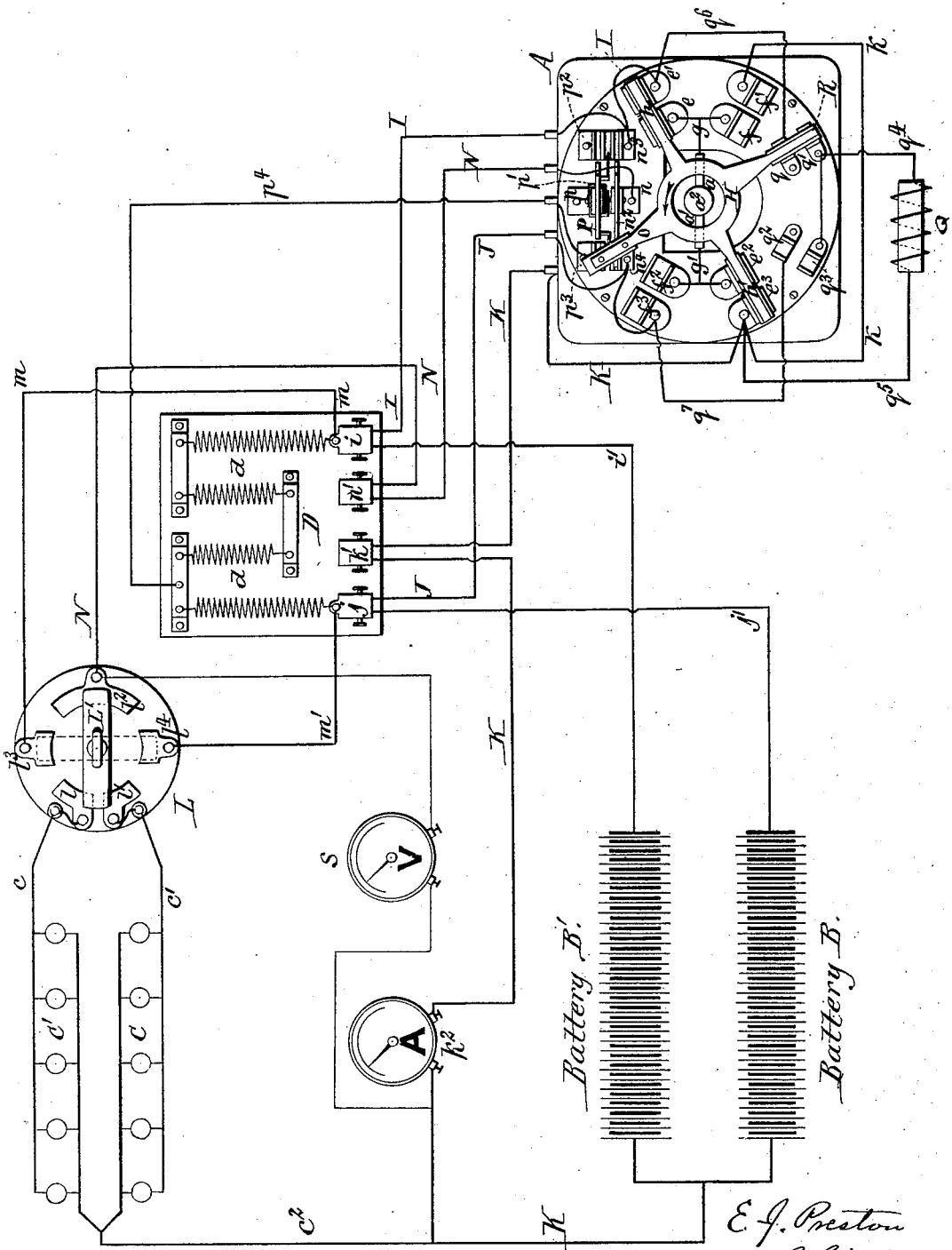

UNITED STATES PATENT OFFICE.

EDWIN JAMES PRESTON AND ARTHUR BERNARD GILL, OF LONDON, ENGLAND, ASSIGNORS TO THE J. STONE & COMPANY, OF SAME PLACE.

ELECTRIC-LIGHTING APPARATUS FOR RAILROAD-CARS.

SPECIFICATION forming part of Letters Patent No. 645,212, dated March 13, 1900.

Application filed January 2, 1900. Serial No. 69. (No model.)

*To all whom it may concern:*

Be it known that we, EDWIN JAMES PRESTON, residing at Kelsey Cottage, Beckenham, and ARTHUR BERNARD GILL, residing at Glencot, Blackheath Park, London, in the county of Kent, England, subjects of the Queen of Great Britain, have invented a new and useful Improvement in Electric-Lighting Apparatus for Railroad-Cars, of which the following is a specification.

This invention relates to an electric-lighting apparatus for railroad-cars which embodies a dynamo driven from one of the car-axles and two storage batteries. The dynamo is provided with an automatic current-reversing mechanism, whereby the current is reversed when the rotation of the dynamo is reversed, and also with an automatic switch, whereby the connections between the storage batteries and the charging and service circuits are automatically alternated upon the reversal of the rotation of the dynamo. A lighting apparatus of this character is described and shown in Letters Patent No. 617,121, granted to us January 3, 1899, to which reference is made for a more complete description thereof. In an apparatus of this character a resistance is usually arranged between the dynamo and the lamps or other translating devices, whereby the current or part of the same is directed to the battery which is being charged, while the other battery is in direct connection with the translating devices.

One object of this invention is to provide means for cutting out the resistance when the lamps or other translating devices are cut out and to connect both batteries with the dynamo without the intervention of the resistance, so that both batteries will be charged in that case simultaneously from the dynamo. When the car provided with this lighting apparatus is running in the daytime and no lights are required, the entire output of the dynamo is sent by this means to both batteries and no part of the output is wasted by overcoming the resistance.

Another object of this invention is to provide means for preventing the battery which contains the preponderating charge from discharging suddenly into the less-strongly-charged battery when the dynamo is put out of operation by the stopping of the car or otherwise, and both batteries are connected in parallel with the translating devices. In the absence of such a provision the preponderating battery would discharge suddenly into the other battery, causing a flickering of the lights. This objectionable effect is avoided by so arranging the connections that part of the resistance is included in the connections between the two batteries, so that the current cannot pass from the preponderating battery into the other battery except by passing through that part of the resistance which is included in the connections between the two batteries. This part of the resistance thus operates as a check upon the discharge from one battery into the other.

The accompanying drawing is a diagrammatic representation of an electric car-lighting apparatus embodying these improvements.

A represents the switchboard of the dynamo or electric generator; B B′, two storage batteries; C C′, two groups or sets of electric lamps or other translating devices, and D a resistance-board on which the resistance coils or members $d$ are arranged. The dynamo is driven from one of the car-axles, and its brushes $a$ $a'$ engage with the commutator $a^2$, so as to permit of turning the latter in either direction and operating the dynamo when running the car forward or backward. In order to permit the reversal of the movement of the armature without changing the direction or polarity of the current, a suitable automatic pole-reversing device is employed, that shown in the drawing being substantially the same as that which is shown and described in Letters Patent No. 602,182, dated April 12, 1898, and No. 617,121, dated January 3, 1899, both granted to us. This reversing device, briefly stated, is constructed as follows:

$e$ $e'$ and $e^2$ $e^3$ represent two pairs of main contacts arranged on diametrically-opposite sides of the switchboard, and $f$ $f'$ and $f^2$ $f^3$ represent two similar pairs of main contacts arranged on diametrically-opposite sides of the switchboard at an angle to the first-mentioned pair of contacts. The contacts $e f$ on one side of the switchboard are connected by wires $g$ with each other and with the adjacent brush $a$, and the contacts $e^2 f^2$ on the opposite side of the switchboard are connected by wires $g'$ with each other and with the other brush $a'$.

H represents the contact-lever, supported on the shaft of the armature and provided with two insulated blades $h\ h'$. When the armature is turning in one direction, its blade $h$ connects the contacts $e\ e'$ and its blade $h'$ connects the contacts $e^2\ e^3$, as shown in the drawing. When the armature turns in the opposite direction, the contact-lever is reversed and its blade $h$ connects the contacts $f f'$ and its blade $h'$ connects the contacts $f^2 f^3$.

I represents one of the main outgoing or positive wires, which is connected at one end with the contact $e'$ and at its opposite end to a binding-post $i$, arranged at one end of the resistance. This binding-post $i$ is connected by a main wire $i'$ with one pole of the battery B'. J represents the other main outgoing or positive wire, which is connected at one end to a binding-post $j$ on the opposite end of the resistance. The binding-post $j$ is connected by a wire $j'$ with one pole of the battery B.

K represents the main return or negative wire, which is connected at one end with the opposite poles of both batteries and with its opposite end to the contact $e^3$ and by a branch wire $k$ to the contact $f'$. For convenience in wiring the main negative wire is run to a binding-post $k'$ on the resistance-board, and to permit of testing an armature $k^2$ is included in the main negative wire, as shown.

L represents a hand-switch whereby the lamps are turned on or off and whereby the resistance is cut out from the circuit between the dynamo and batteries when all the lamps are cut out. This switch is provided with a centrally-pivoted switch-lever L', a pair of adjacent lamp-terminal contacts $l\ l'$, which are arranged diametrically opposite a single dynamo-contact $l^2$, and two diametrically-opposite resistance-contacts $l^3 l^4$, which are preferably arranged at right angles to the lamp-contacts. The resistance-contacts $l^3\ l^4$ are connected by wires $m\ m'$, respectively, with the binding-posts $i\ j$ at opposite ends of the resistance. One of the pair of lamp-contacts is connected by a branch wire $c$ with one side of one set of lamps, and the other of the pair of lamp-contacts is connected by a branch wire $c'$ with one side of the other set of lamps. The opposite sides of both sets of lamps are connected by a lamp-wire $c^2$ with the main negative wire K.

N represents a lamp-wire which is connected at one end to the switch-contact $l^2$ and at its opposite end to a pivot-post $n$ on the dynamo-switchboard, while its intermediate part is connected to a binding-post $n'$ on the resistance-board for convenience in wiring.

$n^2$ represents a battery-reversing switch-lever pivoted on the post $n$ and adapted to alternately engage its ends with contacts $n^3 n^4$, which are included in the circuit of the main wires I and J, respectively.

$o$ represents an insulated presser-arm which is arranged on one side of the dynamo contact-lever and which is adapted to engage with either end of the reversing switch-lever $n^2$ and turn the same into engagement with either of the contacts $n^3$ or $n^4$.

P represents a resistance switch-lever arranged adjacent to the presser-arm of the dynamo contact-lever, parallel with the battery-reversing switch, and pivoted on a post $p$, arranged on the dynamo-switchboard. This resistance switch-lever is normally turned by a spring $p'$ of any suitable construction into such a position that its ends simultaneously engage with contacts $p^2\ p^3$, arranged on the dynamo-switchboard. The contact $p^2$ is connected with the contact $n^3$ of the battery-reversing switch-lever, and the contact $p^3$ is connected by a wire $p^4$ with the resistance, between the ends thereof.

$q\ q'$ and $q^2\ q^3$ represent two pairs of field-contacts arranged on the dynamo-switchboard. The contacts $q'\ q^3$ of both pairs are connected by a wire $q^4$ with one side of the field-magnets Q, and the other side of the field-magnet is connected by a wire $q^5$ with the contact $e^3$. The field-contact $q$ is connected by a wire $q^6$ with the contact $e'$, and the field-contact $q^2$ is connected by a wire $q^7$ with the contact $f^3$.

R represents an insulated field switch-blade mounted on the dynamo contact-lever and adapted to connect the pair of field-contacts $q\ q'$ or the pair of field-contacts $q^2\ q^3$.

For the purpose of testing and determining the charged condition of the batteries a voltmeter $s$ is arranged in a shunt across the lamp-circuit.

When the dynamo is running in the direction of the arrow, the switch-blades $h\ h'$ connect the contacts $e\ e'$ and $e^2 e^3$, the presser-arm has engaged the arm of the battery and resistance switch-levers on one side of their pivots and turned the same, so that the connection between the contacts $p^2$ and $p^3$ is broken, and the battery switch-lever is moved into engagement with the contact $n^4$ and out of engagement with the contact $n^3$, the field switch-blade connects the contacts $q\ q'$, and the lamp switch-lever is turned so one of its arms engages with the dynamo-contact $l^2$ and its opposite arm engages both of the lamp-contacts $l\ l'$. When the parts are in this position and the battery B has been previously charged, the current from the dynamo is distributed as follows: Commencing at the brush $a$ on one side of the armature-commutator the current passes successively through the wires $g$, contact $e$, blade $h$, contact $e'$, and wire I to the binding-post $i$. At this last place the current divides and one part thereof passes through the wire $i'$ to the storage battery B' and charges the same, thence along wire K, including the ammeter and binding-post $k'$, contact $e^3$, switch-blade $h'$, contact $e^2$, wires $g'$, and brush $a'$ to the opposite side of the armature-commutator. The other part of the current passes from the binding-post $i$ through the resistance, binding-post $j$, wire J, contact $n^4$, switch-lever $n^2$, pivot-post $n$, wire N, including binding-post $n'$, dynamo-contact $l^2$, lamp switch-lever L', both lamp-contacts $l\,l'$, through both sets of lamps, and then unites by wire $c^2$ with the current of the charging-battery B' in its return passage along the wire K to the dynamo.

The resistance is so proportioned that the pressure of the current after passing the resistance is somewhat less than the pressure of the charged battery B, which causes the latter under normal conditions to discharge slightly. The current so discharged by the battery B unites at the binding-post $j$ with the dynamo-current which crosses the resistance, and these united currents pass through the lamps and back to the opposite sides of the dynamo and the discharging-battery B. If the voltage of the current generated by the dynamo rises above the normal by reason of an abnormally-high speed of the dynamo and the pressure of the current after passing the resistance is greater than the pressure of the charged battery B, the pressure of the dynamo-current overcomes that of the charged battery and the excess current from the dynamo passes through the battery B to the return-wire K, thereby increasing the charge of the charged battery. The charged battery thus serves as a regulator by absorbing any excess pressure of the dynamo-current which the lamps do not take up, thereby avoiding any undue pressure and wear on the lamps and causing the same to burn uniformly.

Upon turning the lamp switch-lever so that it connects the dynamo-contact $l^2$ with only one lamp-contact $l$ or $l'$ the current passes through and illuminates only one set or group of lamps.

Upon turning the lamp switch-lever so that it clears the dynamo and lamp contacts $l\,l'\,l^2$ and connects the resistance-contacts $l^3\,l^4$, as represented by dotted lines in the drawing, both sets of lamps are extinguished and the resistance is short-circuited or cut out. When the dynamo is running in the direction of the arrow, cutting out of the lamps causes the current from the wire I to divide at the binding-post $i$, one part passing by wire $i'$ direct to the battery B' and the other part passing along the wire $m$, contact $l^3$, switch-lever L', contact $l^4$, wire $m'$, binding-post $j$, and wire $j'$ to battery B, thereby passing around the resistance and delivering the whole output of the dynamo directly into both batteries and charging the same equally.

While the dynamo is running in the direction shown by the arrow in the drawing the field-current passes from the brush $a$ successively through the wires $g$, contact $e$, blade $h$, contact $e'$, wire $q^6$, contact $q$, blade R, contact $q'$, wire $q^4$, field Q, wire $q^5$, contact $e^3$, blade $h'$, contact $e^2$, and wires $g'$ to the other brush $a'$.

When the movement of the car is reversed, the rotation of the dynamo is reversed, whereby the dynamo contact-lever is moved in the opposite direction from that indicated by the arrow, and when running at normal speed the blades $h\,h'$ connect the contacts $f\,f'$ and $f^2\,f^3$, the presser-arm $o$ engages with the opposite arms of the resistance and battery-reversing switch-levers and tilts these levers, so that the battery-reversing lever is disengaged from the contact $n^4$ and engaged with the contact $n^3$, and the resistance switch-lever is moved in the opposite direction, so as to still break the circuit between the contacts $p^2\,p^3$, and the field switch-blade R connects the contacts $q^2\,q^3$. When the parts are in this reversed position, the current from the dynamo is distributed as follows: Commencing at the brush $a'$ the current passes successively through the wires $g'$, contact $f^2$, blade $h'$, contact $f^3$, and main wire J to binding-post $j$, where the current divides. From this post one part of the current passes along the wire $j'$ to and through the battery B and charges the same, thence, through the main negative wire K, including the ammeter and binding-post $k'$, branch wire $k$, contact $f'$, blade $h$, contact $f$, and wires $g$, to brush $a$. The other part of the current passes from binding-post $j$, through the resistance, binding-post $i$, wire I, contact $n^3$, reversing switch-lever $n^2$, pivot-post $n$, wire N, including binding-post $n'$, dynamo-contact $l^2$, lamp switch-lever L', lamp-contacts $l\,l'$, wires $c\,c'$, to and through both sets of lamps, wire $c^2$, and then to the main negative wire K back to the dynamo. Under normal conditions the charged battery B' discharges slightly and the current so discharged passes from the battery B', through wire $i'$, to binding-post $i$, where it meets the current from the dynamo that has crossed the resistance and joins the same on its way to the lamps. If the lamps do not take up all the dynamo-current which passes the resistance, this surplus current is forced into the charged battery B' and increases the charge of the latter, thereby regulating the current and avoiding flickering in the lamps, as when the dynamo was running in the other direction. While the dynamo is running normally in the direction opposite to that indicated by the arrow the field-current passes from the brush $a'$, through the wires $g'$, contact $f^2$, blade $h'$, contact $f^3$, wire $q^7$, contact $q^2$, field-blade R, contact $q^3$, wire $q^4$, field Q, wire $q^5$, contact $e^3$, wire $k$, contact $f'$, blade $h$, contact $f$, and wires $g$, to the opposite brush $a$.

Upon turning the lamp switch-lever so as to cut out the lamp and the resistance when the dynamo is moving in the direction opposite to that indicated by the arrow the current from the wire J divides at binding-post $j$, and one part passes directly by wire $j'$ to one side of battery B and the other part passes from binding-post $j$ by wire $m'$, contact $l^4$, switch-lever $L'$, contact $l^3$, wire $m$, binding-post $j$, and wire $i'$ to one side of battery $B'$. The current passes from the opposite side of both batteries through wire K back to the dynamo.

When the dynamo stops running after moving in the direction of the arrow or slows down, owing to the stopping of the car or slackening in the speed thereof, the dynamo contact-lever is moved automatically away from the switchboard in the manner described in the Letters Patent referred to, whereby the blades $h\ h'$ are disengaged from all the main contacts, the field-blade is disengaged from the field-contacts, and the presser-arm is disengaged from the battery-reversing and resistance switch-levers. This permits the spring $p'$ to turn the resistance switch-lever T so as to connect the contacts $p^2\ p^3$, thereby cutting the dynamo off from the lamps and placing both batteries in parallel with the lamps. When the parts are in this position, the current from both batteries passes to the lamps as follows: The current from the battery B passes from one side of the same successively through the wire $j'$, binding-post $j$, wire J, contact $n^4$, reversing switch-lever $n^2$, pivot-post $n$, wire N, including binding-post $n'$, contact $l^2$, switch-lever $L'$, contacts $l\ l'$, wires $c\ c'$ to both sets of lamps, wire $c^2$, and wire K to opposite side of battery B. The current from battery $B'$ passes from one side of the same successively through the wire $i'$, binding-post $i$, wire I, contact $n^3$, contact $p^2$, resistance switch-lever P, contact $p^3$, wire $p^4$, and through part of the resistance to binding-post $j'$. At the binding-post $j'$ the current from the battery $B'$ meets the current from battery B and thence pass together to and through the lamps, as before described, to the opposite sides of the batteries.

When the dynamo stops after running in the direction opposite to that indicated by the arrow or slows down sufficiently to move the dynamo contact-lever into an inoperative position, the resistance-switch is turned by its spring $p'$ so as to connect the contacts $p^2\ p^3$, and the battery-reversing switch-lever $n^2$ is left in engagement with the contact $n^3$ and out of engagement with the contact $n^4$. When the parts are in this position, the dynamo is cut out and the current from both batteries passes to the lamps as follows: The current from battery $B'$ passes from one side of the same successively through wire $i'$, binding-post $i$, wire I, contact $n^3$, reversing-lever $n^2$, pivot-post $n$, wire N, including binding-post $n'$, contact $l^2$, switch-lever $L'$, contact $l\ l'$, wires $c\ c'$, both sets of lamps, wire $c^2$, and main wire K to the opposite side of battery $B'$. The current from battery B passes from one side of the same successively through wire $j'$, binding-post $j$, through part of the resistance to wire $p^4$, contact $p^3$, switch P, contact $p^2$, to contact $n^3$, where it meets the current from battery $B'$, and thence the currents of both batteries pass together to the lamps and return to the opposite sides of the batteries. It will thus be seen that when the dynamo becomes inoperative after moving in either direction the batteries are automatically placed in parallel with the lamps and a part of the resistance is always interposed between both batteries, thereby preventing the heavily-charged battery from backing up suddenly into the lightly-charged battery, whereby the batteries are caused to balance or equalize gradually and flickering of the lamps is avoided.

By this arrangment of the circuits all of the resistance is in use and interposed between the dynamo and the charged battery when the dynamo is running normally and the lamps are in use, a part of the resistance is cut out and a part is interposed between the batteries when the dynamo is cut out and both batteries are connected with the lamps, and all of the resistance is cut out when the lamps are extinguished and both batteries are charged by the dynamo.

We claim as our invention—

1. The combination with the dynamo, two storage batteries, a translating device, and a resistance interposed between the dynamo and the translating device, of a hand-switch interposed between the translating device and the resistance and provided with contacts and connections arranged to cut out the resistance and connect the dynamo with both batteries when the translating device is cut out, substantially as set forth.

2. The combination with the dynamo, two storage batteries, a translating device, and a resistance interposed between the dynamo and the translating device, of a hand-switch interposed between the translating device and the resistance and provided with a resistance-contact connected with the dynamo through the resistance, a translating device contact, two battery-contacts connected with the batteries directly, without the intervention of the resistance, and a switch-lever which in one position connects the resistance-contact with the translating-device contact and in the other position breaks this connection and connects both battery-contacts, substantially as set forth.

3. The combination with the dynamo, two storage batteries, a translating device, and a resistance interposed between the dynamo and the translating device, of a switch-circuit connecting the batteries with the resistance at a point between the ends thereof, and a switch arranged in said circuit, which switch is closed when the dynamo is rendered inoperative, thereby cutting out part of the resistance and leaving the remaining part included in the connection extending from one battery to the other, substantially as set forth.

4. The combination with the dynamo, two storage batteries, a translating device, and a resistance interposed between the dynamo and the translating device, of a hand-switch interposed between the translating device and the resistance and provided with contacts and connections arranged to cut out the resistance and connect the dynamo with both batteries when the translating device is cut out, and a switch-circuit connecting the batteries with the resistance at a point between the ends thereof, and a switch arranged in said circuit and arranged to be closed when the dynamo is rendered inoperative, substantially as set forth.

Witness our hands this 12th day of December, 1899.

EDWIN JAMES PRESTON.
ARTHUR BERNARD GILL.

Witnesses:
FRED C. HARRIS,
JOSEPH LAKE.